(12) United States Patent
Nate

(10) Patent No.: US 10,389,256 B2
(45) Date of Patent: Aug. 20, 2019

(54) ISOLATED DC/DC CONVERTER AND PRIMARY SIDE CONTROLLER THEREOF, CONTROL METHOD AND POWER ADAPTOR AND ELECTRONIC DEVICE USING THE SAME

(71) Applicant: ROHM CO., LTD., Ukyo-ku, Kyoto (JP)

(72) Inventor: Satoru Nate, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 29 days.

(21) Appl. No.: 15/642,796

(22) Filed: Jul. 6, 2017

(65) Prior Publication Data

US 2018/0013353 A1 Jan. 11, 2018

(30) Foreign Application Priority Data

Jul. 8, 2016 (JP) ................. 2016-135696

(51) Int. Cl.
*H02M 3/335* (2006.01)
*H02M 1/08* (2006.01)
*H02M 1/14* (2006.01)

(52) U.S. Cl.
CPC ......... *H02M 3/33523* (2013.01); *H02M 1/08* (2013.01); *H02M 1/14* (2013.01); *H02M 3/33507* (2013.01)

(58) Field of Classification Search
None
See application file for complete search history.

(56) References Cited

U.S. PATENT DOCUMENTS

2005/0259448 A1* 11/2005 Koike ............... H02M 3/33523
363/21.01
2015/0244274 A1* 8/2015 Fahlenkamp ..... H02M 3/33507
363/21.15

FOREIGN PATENT DOCUMENTS

JP 2012120399 A 6/2012
JP 2014079155 A 5/2014

* cited by examiner

*Primary Examiner* — Alex Torres-Rivera
*Assistant Examiner* — Henry E Lee, III
(74) *Attorney, Agent, or Firm* — Cantor Colburn LLP

(57) ABSTRACT

A primary side controller for controlling a switching transistor on a primary side of an isolated DC/DC converter, includes: a low voltage state detecting circuit configured to detect a low voltage state in which an output voltage of the DC/DC converter is lower than a predetermined value; and a pulse width modulator configured to generate a pulse signal whose ON time is adjusted depending on a feedback signal from a secondary side, wherein a period of the pulse signal in the low voltage state is longer than a period of the pulse signal in a non-low voltage state in which the output voltage is higher than the predetermined value.

19 Claims, 11 Drawing Sheets

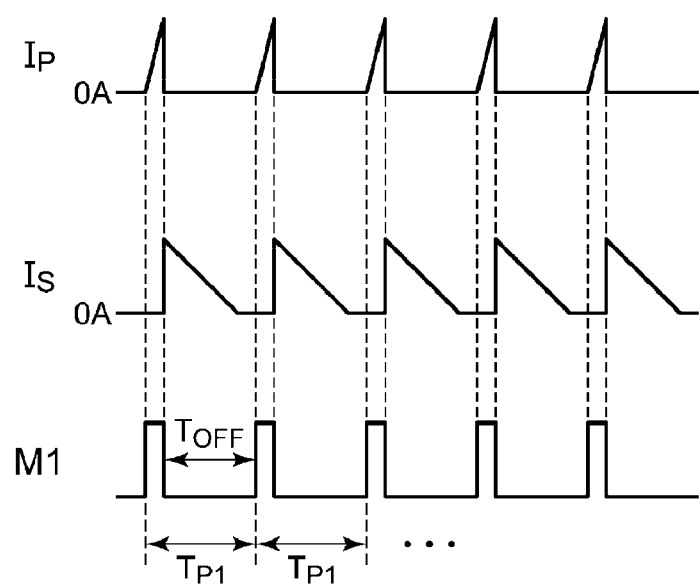

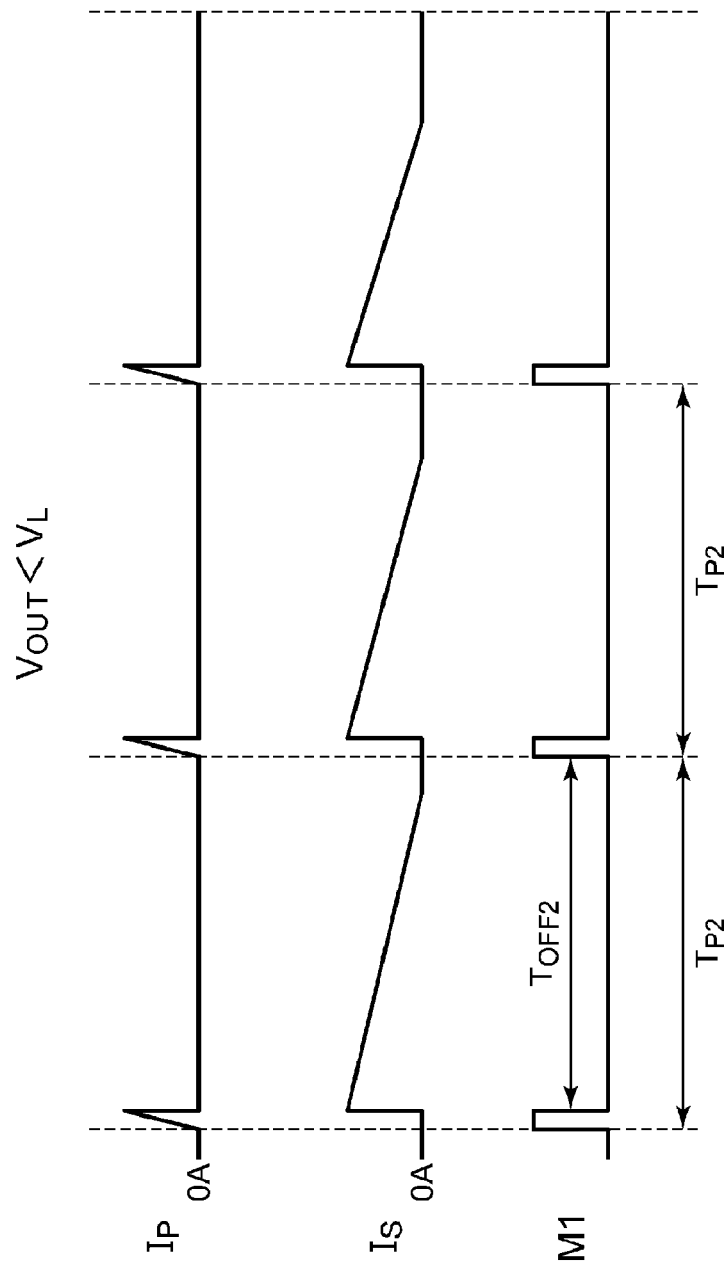

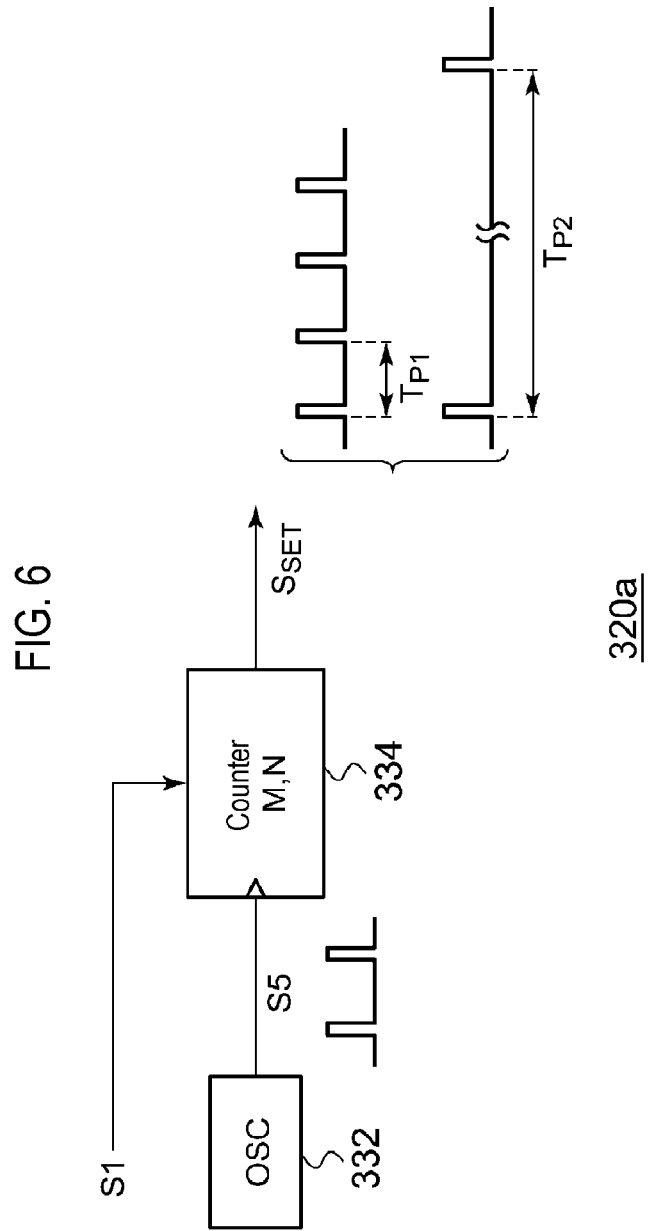

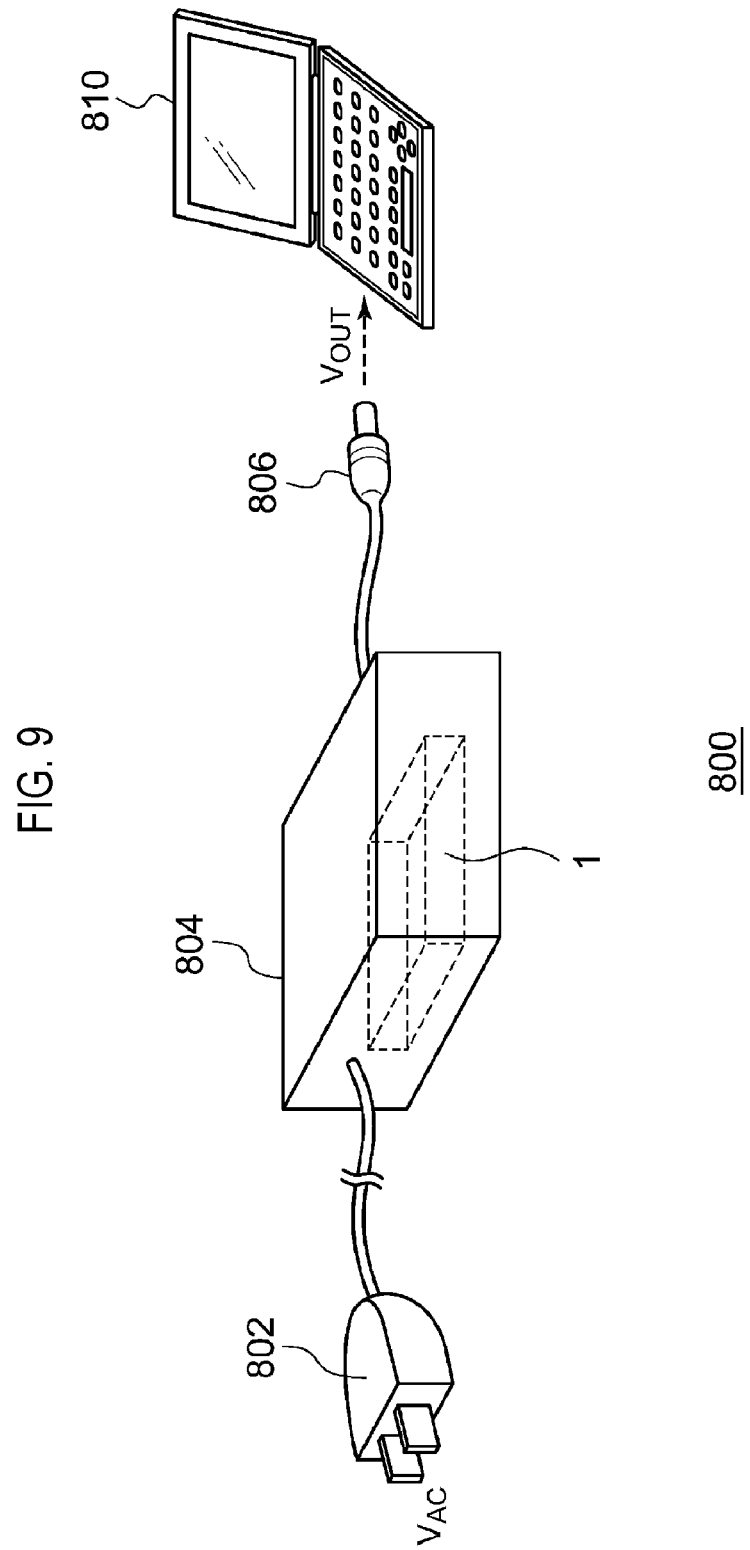

ISOLATED DC/DC CONVERTER AND PRIMARY SIDE CONTROLLER THEREOF, CONTROL METHOD AND POWER ADAPTOR AND ELECTRONIC DEVICE USING THE SAME

CROSS-REFERENCE TO RELATED APPLICATION

The present invention claims priority under 35 U.S.C. § 119 to Japanese Patent Application No. 2016-135696, filed on Jul. 8, 2016, the entire contents of which are incorporated herein by reference.

TECHNICAL FIELD

The present disclosure relates to an isolated DC/DC converter.

BACKGROUND

An isolated DC/DC converter, specifically, a flyback type or forward type DC/DC converter, is used in various power source circuits including an AC/DC converter. FIG. 1 is a circuit diagram of an AC/DC converter 100r including a synchronous rectification type flyback converter 200r.

The AC/DC converter 100r mainly includes a fuse 102, an input capacitor Ci, a filter 104, a diode rectifier circuit 106, a smoothing capacitor Cs, and the flyback converter 200r.

A commercial AC voltage $V_{AC}$ is input to the filter 104 via the fuse 102 and the input capacitor Ci. The filter 104 removes the noise of the commercial AC voltage $V_{AC}$. The diode rectifier circuit 106 is a diode bridge circuit that full-wave rectifies the commercial AC voltage $V_{AC}$. An output voltage from the diode rectifier circuit 106 is smoothed by the smoothing capacitor Cs and converted into a DC voltage $V_{IN}$.

The isolated flyback converter 200r receives the DC voltage $V_{IN}$ by an input terminal P1, steps down the same, and supplies an output voltage $V_{OUT}$ stabilized to a target value to a load (not shown) connected to an output terminal P2.

A switching transistor M1 is connected to a primary winding W1 of a transformer T1. A rectifier diode D1 is connected to a secondary winding W2 of the transformer T1, and an output capacitor Co1 is connected to the output terminal P2. A feedback circuit 206 drives a light emitting element of a photocoupler 204 by a current corresponding to a difference between the output voltage $V_{OUT}$ and its target voltage $V_{OUT(REF)}$. A feedback current $I_{FB}$ corresponding to the difference flows through a light receiving element of the photocoupler 204.

A rectifier diode D2 and a smoothing capacitor Co2 form a power source circuit 208 together with an auxiliary winding W3 of the transformer T1. A source voltage $V_{CC}$ generated by the power source circuit 208 is supplied to a power (VCC) terminal of a primary side controller 300r.

The primary side controller 300r is a pulse width modulation (PWM) controller. A feedback signal $V_{FB}$ corresponding to the feedback current $I_{FB}$ is generated at a feedback (FB) terminal of the primary side controller 300r. Further, a current detection signal $V_{CS}$ proportional to a primary current $I_P$ flowing through the switching transistor M1 is feedback to a current detection (CS) terminal of the primary side controller 300r. The current detection signal $V_{CS}$ is a voltage drop of a sense resistor $R_{CS}$ installed in series with the switching transistor M1.

For example, the primary side controller 300r includes a pulse width modulator of a peak current mode, and generates a pulse signal $S_{OUT}$ having a constant frequency (period) and having a duty ratio corresponding to the feedback signal $V_{FB}$ and the current detection signal $V_{CS}$ to drive the switching transistor M1 connected to an output (OUT) terminal.

The present inventor has reviewed an operation of the DC/DC converter 200r of FIG. 1 in a state where the output voltage $V_{OUT}$ is low, and recognized the following issues. The output voltage $V_{OUT}$ is low, for example, immediately after the startup or when the output of the DC/DC converter 200r is grounded.

FIG. 2 is a waveform diagram after the start of the DC/DC converter 200r of FIG. 1. The switching transistor M1 is turned on in synchronization with an oscillator clock (a set signal $S_{SET}$) of a constant period $T_{OSC}$. When the switching transistor M1 is turned on, the primary current $I_P$ flows through the primary winding W1. The primary current $I_P$ increases with a slope $V_{IN}/L_P$ proportional to an input voltage $V_{IN}$. $L_P$ is the inductance of the primary winding W1.

When the primary current $I_P$ reaches a peak level corresponding to the feedback signal $V_{FB}$, the switching transistor M1 is turned off. During an OFF period of the switching transistor M1, a secondary current $I_S$ flows through the secondary winding W2. The secondary current $I_S$ decreases with a slope $(V_{OUT}+V_F)/L_S$. $L_S$ denotes the inductance of the secondary winding W2 and $V_F$ denotes a forward voltage of the rectifier diode D1.

Thereafter, when the set signal $S_{SET}$ is asserted, the switching transistor M1 is turned on again. The primary current $I_P$ starts to rise with a current amount of the secondary current $I_S$ immediately before the switching transistor M1 is turned on, as a starting point. The DC/DC converter 200r repeats this operation.

A decrement $\Delta I_S$ of the secondary current $I_S$ in an OFF time $T_{OFF}$ is $\Delta I_S=(V_{OUT}+V_F)/L_S \times T_{OFF}$. Since the output voltage $V_{OUT}$ is low immediately after the startup, the slope of the secondary current $I_S$ in the OFF time $T_{OFF}$ is small, and therefore, the decrement $\Delta I_S$ is small. Thus, the secondary current $I_S$ does not drop to zero during the OFF time $T_{OFF}$.

When this operation repeats, the DC/DC converter 200r starts in a continuous mode and large currents $I_P$ and $I_S$ flow through the primary winding W1 and the secondary winding W2. When the DC/DC converter 200r starts in the continuous mode, a very high surge voltage exceeding 100V is generated across the rectifier diode D1 of the secondary side. In addition, a drain voltage $V_{DS1}$ of the switching transistor M1 increases. Further, the same phenomenon occurs not only at the startup but also when the output is grounded.

Therefore, in order to cope with the operation in the current continuation mode in a low output state, conventionally, it was necessary to devise the transformer T1 or to design a withstand voltage and the like of the switching transistor M1 or the rectifier diode D1 to be high, leading to an increase in cost.

SUMMARY

Some embodiments of the present disclosure provide a DC/DC converter in which a current in a low voltage state is suppressed.

According to one embodiment of the present disclosure, there is provided a primary side controller for controlling a switching transistor on a primary side of an isolated DC/DC converter. The primary side controller includes a low voltage state detecting circuit configured to detect a low voltage state in which an output voltage of the DC/DC converter is lower than a predetermined value, and a pulse width modulator configured to generate a pulse signal having an ON time which is adjusted depending on a feedback signal from a secondary side of isolated DC/DC converter. A period of the pulse signal in the low voltage state is longer than a period of the pulse signal in a non-low voltage state in which the output voltage is higher than the predetermined value.

By lengthening the period of the pulse signal in the low voltage state, an OFF time of the switching transistor is lengthened. Thus, it is possible to increase a decrement of a current in the secondary winding, and to reduce a current in the low voltage state.

Further, according to another embodiment of the present disclosure, a primary side controller is provided. The primary side controller is for controlling a switching transistor on a primary side of an isolated DC/DC converter, and it includes a low voltage state detecting circuit configured to detect a low voltage state in which an output voltage of the DC/DC converter is lower than a predetermined value, and a pulse width modulator configured to generate a pulse signal having an ON time which is adjusted depending on a feedback signal from a secondary side of the isolated DC/DC converter. An OFF time of the pulse signal in the low voltage state is longer than an OFF time of the pulse signal in a non-low voltage state in which the output voltage is higher than the predetermined value.

By lengthening the OFF time of the switching transistor in the low voltage state, it is possible to increase the decrement of the current in the secondary winding, and to reduce the current flowing through the transformer in the low voltage state.

Further, according to another embodiment of the present disclosure, a primary side controller is provided. The primary side controller includes a low voltage state detecting circuit configured to detect a low voltage state in which an output voltage of the DC/DC converter is lower than a predetermined value, and a pulse width modulator configured to generate a pulse signal having an ON time which is adjusted depending on a feedback signal from a secondary side of the isolated DC/DC converter. A timing, at which the pulse signal transitions to an ON level in the low voltage state, is delayed, as compared with a timing of a non-low voltage state in which the output voltage is higher than the predetermined value.

Thus, it is possible to lengthen the OFF time of the switching transistor in the low voltage state, to increase the decrement of the current in the secondary winding becomes larger, and to the current flowing through the transformer in the low voltage state.

The pulse width modulator may include a reset signal generating circuit configured to generate a reset signal asserted depending on the feedback signal, a set signal generating circuit configured to generate a periodic set signal, and a logic circuit configured to generate the pulse signal which transitions to an ON level in response to the set signal and to an OFF level in response to the reset signal. Further, a period of the set signal in the low voltage state may be longer than a period of the set signal in the non-low voltage state.

The set signal generating circuit may include an oscillator configured to oscillate at a predetermined frequency, and a counter configured to set an M period (where M is a natural number) of an oscillation signal from the oscillator in the non-low voltage state as the period of the set signal, and to set an N period (where N>M) of the oscillation signal in the low voltage state as the period of the set signal.

The set signal generating circuit may include a variable frequency oscillator, and the oscillation frequency of the oscillator may be dependent on a detection signal corresponding to the output voltage in the low voltage state.

The DC/DC converter may include a transformer including a primary winding, a secondary winding, and an auxiliary winding. The low voltage state detecting circuit may be configured to monitor the output voltage based on a voltage across the auxiliary winding at an OFF time of the switching transistor.

During the OFF time of the switching transistor, a voltage substantially proportional to the output voltage is generated in the auxiliary winding. Thus, it is possible to detect the low voltage state by monitoring a voltage of the auxiliary winding.

The switching transistor may be housed in the same package as that of the primary side controller. Reducing the current in the low voltage state reduces a voltage between a drain and a source of the switching transistor. Therefore, it is possible to ease the conditions such as a withstand voltage or the like required for the switching transistor, and it is easy to house it in the same package as that of the primary side controller.

The reset signal generating circuit may include a reset comparator configured to compare a current detection signal indicating a current flowing through the switching transistor with the feedback signal. The reset signal may be dependent on an output signal of the reset comparator.

Further, according to another embodiment of the present disclosure, a primary side controller is provided. The primary side controller includes a low voltage state detecting circuit configured to detect a low voltage state in which an output voltage of the DC/DC converter is lower than a predetermined value, and a pulse width modulator configured to generate a narrow pulse signal having an ON time which is independent of the feedback signal in the low voltage state, and to generate a pulse signal having an ON time which is adjusted depending on a feedback signal from a secondary side of the isolated DC/DC converter in a non-low voltage state in which the output voltage is higher than the predetermined value.

By narrowing the pulse width of the pulse signal in the low voltage state, namely the ON time, it is possible to reduce an increment of the current of the primary winding during the ON time. Thus, it is possible to reduce the current in the low voltage state.

According to another embodiment of the present disclosure, there is provided a DC/DC converter. The DC/DC converter is an isolated DC/DC converter, which includes a transformer including a primary winding, a secondary winding, and an auxiliary winding, a switching transistor connected to the primary winding, a secondary side rectifier circuit configured to rectify a current flowing through the secondary winding to generate an output voltage, a photocoupler including a light emitting element and a light receiving element, a feedback circuit configured to drive the light emitting element of the photocoupler with a current corresponding to a difference between the output voltage and a target value, and a primary side controller configured to drive the switching transistor based on a feedback signal corresponding to a current flowing through the light receiving element of the photocoupler. The primary controller is configured to drive (i) the switching transistor depending on a first pulse signal which has a first period and an ON time of the first pulse signal is adjusted depending on the feedback signal when a voltage across the auxiliary winding is greater than a predetermined value, and drive (ii) the switching transistor depending on a second pulse signal which has a second period longer than the first period and an ON time of the second pulse signal is adjusted depending on the feedback signal when the voltage across the auxiliary winding is smaller than the predetermined value.

According to another embodiment of the present disclosure, an electronic device is provided. The electronic device may include a load, a diode rectifier circuit configured to full-wave rectify a commercial AC voltage, a smoothing capacitor configured to smooth an output voltage of the diode rectifier circuit to generate a DC input voltage, and any one of the aforementioned DC/DC converters configured to step down the DC input voltage and supplies the same to the load.

According to another embodiment of the present disclosure, a power adaptor is provided. The power adaptor may include a diode rectifier circuit configured to full-wave rectify a commercial AC voltage, a smoothing capacitor configured to smooth an output voltage of the diode rectifier circuit to generate a DC input voltage, and any one of the aforementioned DC/DC converters configured to step down the DC input voltage and supplies the same to a load.

According to another embodiment of the present disclosure, there is provided a method of controlling a switching transistor on a primary side of an isolated DC/DC converter. The method of controlling includes comparing an output voltage of the DC/DC converter with a predetermined value, generating a first pulse signal having ON time which is adjusted depending on a feedback signal from a secondary side of the isolated DC/DC converter, the first pulse signal having a first period when the output voltage is higher than the predetermined value, generating a second pulse signal having an ON time which is adjusted depending on the feedback signal from the secondary side, the second pulse signal having a second period longer than the first period when the output voltage is lower than the predetermined value, and driving the switching transistor depending on the first or second pulse signal.

According to another embodiment of the present disclosure, a method of controlling is provided. The method of controlling includes comparing an output voltage of the DC/DC converter with a predetermined value, generating a first pulse signal having an ON time which is adjusted depending on a feedback signal from a secondary side of the isolated DC/DC converter, the first pulse signal having a first period when the output voltage is higher than the predetermined value, generating a second pulse signal having an ON time which is adjusted depending on the feedback signal from the secondary side, the second pulse signal having an OFF time which is longer than the first period when the output voltage is lower than the predetermined value; and driving the switching transistor depending on the first or second pulse signal.

In addition, any combination of the foregoing components or any replacement of the components or representations of the present disclosure between methods, devices, systems, and the like may also be effective as embodiments of the present disclosure.

BRIEF DESCRIPTION OF THE DRAWINGS

FIG. 4A is an operational waveform diagram of a DC/DC converter in a non-low voltage state, and FIG. 4B is an operational waveform diagram of a DC/DC converter in a low voltage state.

FIG. 6 is a diagram illustrating a configuration example of a set signal generating circuit.

FIG. 9 is a diagram illustrating an AC adapter including an AC/DC converter.

DETAILED DESCRIPTION

Figure 1:
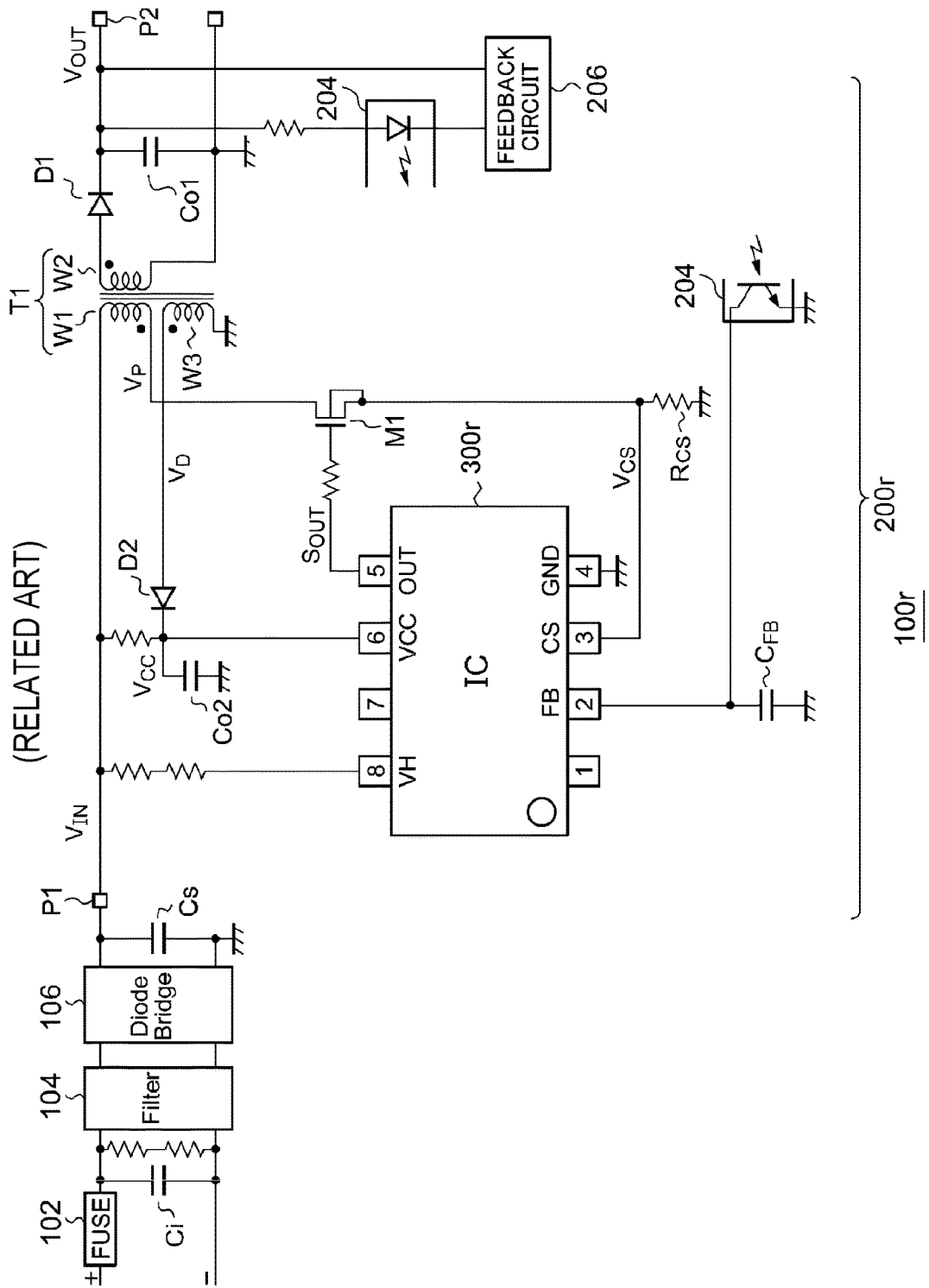
FIG. 1 is a circuit diagram of an AC/DC converter including a synchronous rectification type flyback converter.

Embodiments of the present disclosure will be now described in detail with reference to the drawings. Like or equivalent components, members, and processes illustrated in each drawing are given like reference numerals and a repeated description thereof will be properly omitted. Further, the embodiments are presented by way of example only, and are not intended to limit the present disclosure, and any feature or combination thereof described in the embodiments may not necessarily be essential to the present disclosure.

In the present disclosure, "a state where a member A is connected to a member B" includes a case where the member A and the member B are physically directly connected or even a case where the member A and the member B are indirectly connected through any other member that does not affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not affect an electrical connection state between the members A and C or the members B and C or does not impair function and effects achieved by combinations of the members A and C or the members B and C, in addition to a case where the member A and the member C or the member B and the member C are directly connected.

Figure 3:
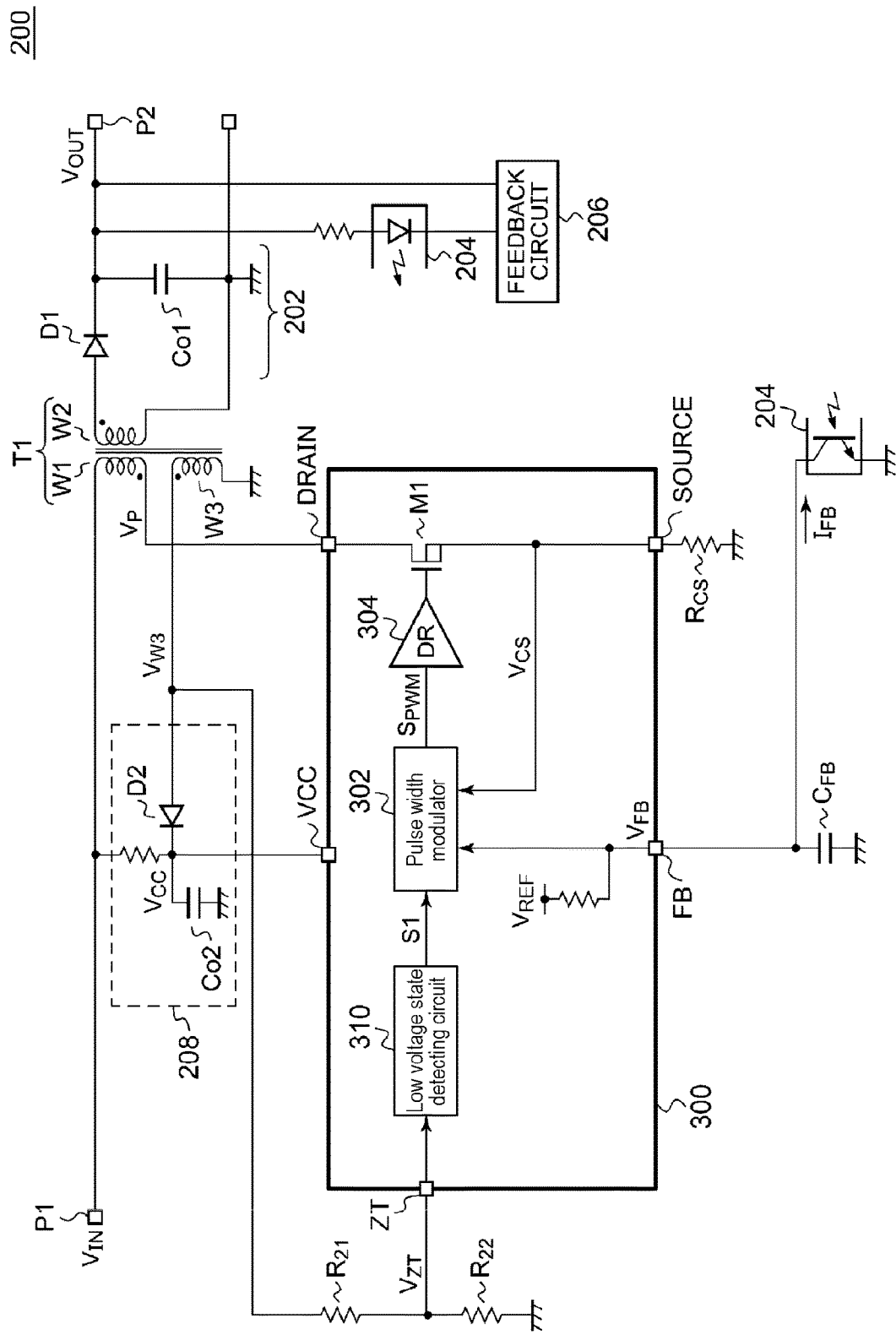
FIG. 3 is a block diagram of a DC/DC converter according to an embodiment of the present disclosure.

FIG. 3 is a block diagram of a DC/DC converter 200 according to an embodiment of the present disclosure. The DC/DC converter 200 includes a transformer T1, a primary side controller 300, a secondary side rectifier circuit 202, a photocoupler 204, a feedback circuit 206, and a power source circuit 208.

The transformer T1 includes a primary winding W1, a secondary winding W2, and an auxiliary winding W3. The switching transistor M1 is connected to the primary winding W1. In this embodiment, the switching transistor M1 is housed in a package of the primary side controller 300.

The secondary side rectifier circuit 202 includes a rectifier diode D1 and an output capacitor Co1, and rectifies a current $I_S$ flowing through the secondary winding W2 to generate an output voltage $V_{OUT}$. The photocoupler 204 includes a light emitting element and a light receiving element. The feedback circuit 206 is, for example, a shunt regulator, and drives the light emitting element of the photocoupler 204 by a current corresponding to a difference between the output voltage $V_{OUT}$ and its target value $V_{OUT(REF)}$. A feedback current $I_{FB}$ corresponding to the difference between the output voltage $V_{OUT}$ and the target value $V_{OUT(REF)}$ flows through the light receiving element of the photocoupler 204.

The primary side controller 300 includes a source (SOURCE) terminal, a drain (DRAIN) terminal, a feedback (FB) terminal, a power (VCC) terminal, and a voltage detection (ZT) terminal, and is housed in a single package.

The FB terminal is connected to the light receiving element of the photocoupler 204, and a feedback signal $V_{FB}$ corresponding to the feedback current $I_{FB}$ is generated at the FB terminal. A drain of the switching transistor M1 is connected to the DRAIN terminal, and a source terminal of the switching transistor M1 is connected to the SOURCE terminal. A current sensor resistor $R_{CS}$ is externally attached between the SOURCE terminal and a ground. A voltage drop (current detection signal) $V_{CS}$ proportional to the current $I_S$ flowing through the primary winding W1 is generated in the current sense resistor $R_{CS}$ during an ON time of the switching transistor M1. The current detection signal $V_{CS}$ is used for overcurrent protection and also used to adjust the ON time. Further, the current sense resistor $R_{CS}$ may be embedded in the primary side controller 300.

The primary side controller 300 switches the switching transistor M1 depending on the feedback signal $V_{FB}$ such that the difference between the output voltage $V_{OUT}$ and the target value $V_{OUT(REF)}$ approaches zero. The primary side controller 300 includes a pulse width modulator 302, a driver 304, and a low voltage state detecting circuit 310, in addition to the switching transistor M1.

The low voltage state detecting circuit 310 detects a low voltage state in which the output voltage $V_{OUT}$ of the DC/DC converter 200 is lower than a predetermined value $V_L$. Further, a state in which the output voltage $V_{OUT}$ is higher than the predetermined value $V_L$ will be referred to as a non-low voltage state. Although not limited thereto, for example, a voltage $V_{W3}$ across the auxiliary winding W3 may be used to detect the low voltage state. During an OFF time of the switching transistor M1, a voltage $(V_{OUT}+V_F) \times n_A/n_S$ substantially proportional to the output voltage $V_{OUT}$ appears in the auxiliary winding W3. $V_F$ is a forward voltage of the rectifier diode D1, and $n_A$ is the number of turns of the auxiliary winding W3 and $n_S$ is the number of turns of the secondary winding W2.

The voltage $V_{W3}$ of the auxiliary winding W3 is divided by resistors $R_{21}$ and $R_{22}$ and input to the ZT terminal. The low voltage stage detecting circuit 310 detects a low voltage state by comparing a voltage $V_{ZT}$ of the ZT terminal with a threshold voltage $V_{TH}$ corresponding to the predetermined value $V_L$. A determination signal S1 indicating whether it is in a low voltage state or a non-low voltage state is input to the pulse width modulator 302 from the low voltage state detecting circuit 310. The determination signal S1 may be a signal indicating a degree of a low voltage. Further, the ZT terminal should not be confused with a terminal for detecting a zero current installed in a quasi-resonance controller.

The pulse width modulator 302 generates a pulse signal $S_{PWM}$ at least depending on the feedback signal $V_{FB}$. The driver 304 drives the switching transistor M1 depending on the pulse signal $S_{PWM}$.

The pulse width modulator 302 adjusts an ON time of the pulse signal $S_{PWM}$ depending on the feedback signal $V_{FB}$ from the secondary side. Although not limited thereto, the pulse width modulator 302 is configured to shift the pulse single $S_{PWM}$ to an OFF level when the current detection signal $V_{CS}$ reaches the feedback signal $V_{FB}$. Further, the pulse width modulator 302 is configured such that a period $T_{P2}$ of the pulse signal $S_{PWM}$ in a low voltage state is longer than a period $T_{P1}$ of the pulse signal $S_{PWM}$ in a non-low voltage state. The period $T_{P1}$ may be determined such that the current flowing through the transformer T1 becomes a desired amount in the non-low voltage state, and is defined, for example, such that the DC/DC converter 200 is in a discontinuous current mode (or a critical mode).

The period $T_{P2}$ may be determined such that the current flowing through the transformer T1 becomes a desired amount in the low voltage state, and similar to the non-low voltage state, it is defined such that the DC/DC converter 200 is in a discontinuous current mode (or a critical mode).

That is, the primary side controller 300 drives (i) the switching transistor M1 depending on the pulse signal $S_{PWM}$ which has the first period $T_{P1}$ and whose ON time is adjusted depending on the feedback signal $V_{FB}$ when the voltage $V_{W3}$ across the auxiliary winding W3 is greater than the predetermined value $V_L$. Further, the primary side controller 300 drives (ii) the switching transistor M1 depending on the pulse signal $S_{PWM}$ which has the second period $T_{P2}$ longer than the first period $T_{P1}$ and whose ON time is adjusted depending on the feedback signal $V_{FB}$ when the voltage $V_{W3}$ across the auxiliary winding W3 is smaller than the predetermined value $V_L$.

The above is the configuration of the DC/DC converter 200. Next, an operation thereof will be described.

FIG. 4A is an operational waveform diagram of the DC/DC converter 200 in a non-low voltage state. When the output voltage $V_{OUT}$ is higher than the predetermined value $V_L$, the period of the pulse signal $S_{PWM}$ becomes a first value (first period) $T_{P1}$. Since the output voltage $V_{OUT}$ is sufficiently high, the slope of the current $I_S$ of the secondary winding W2 at the OFF time $T_{OFF}$ is sharp, and thus, the DC/DC converter 200 operates in the discontinuous current mode.

Figure 2:
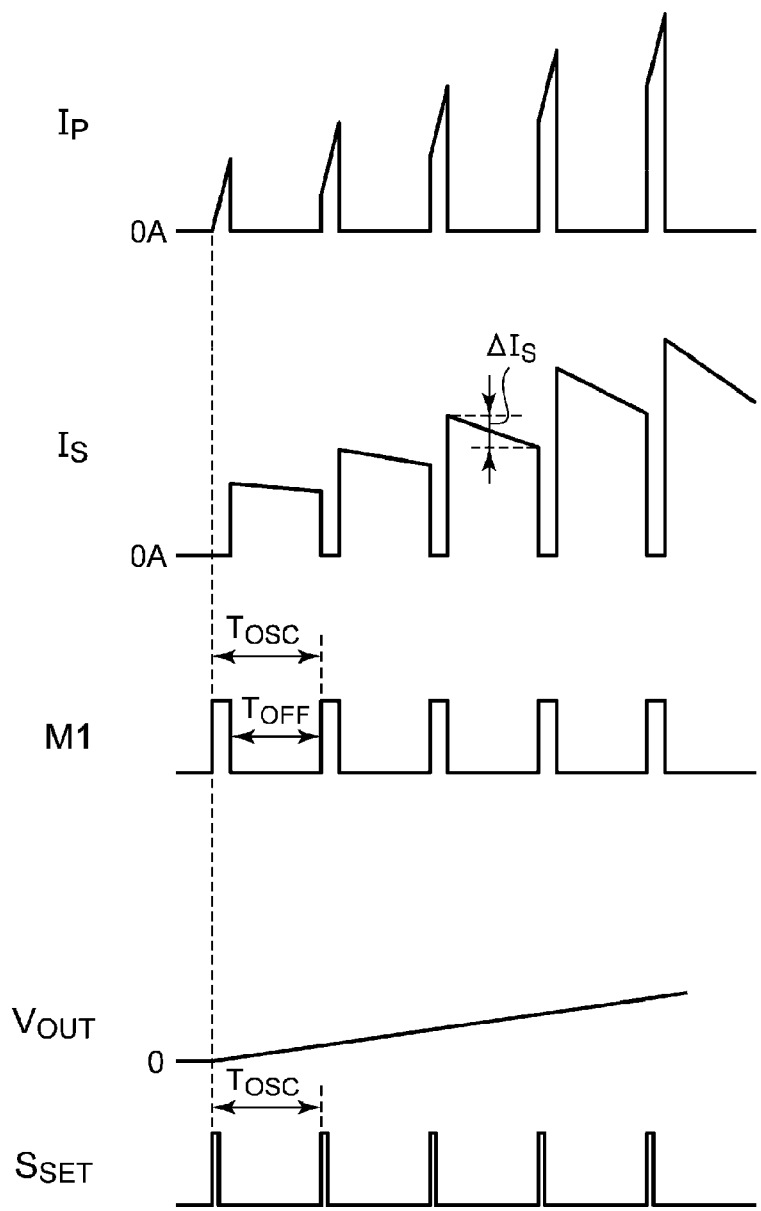
FIG. 2 is a waveform diagram when the DC/DC converter of FIG. 1 starts.

FIG. 4B is an operational waveform diagram of the DC/DC converter 200 in a low-voltage state. When the output voltage $V_{OUT}$ is lower than the predetermined voltage $V_L$, the period of the pulse signal $S_{PWM}$ becomes a second value (second period) $T_{P2}$. Since the output voltage $V_{OUT}$ is low, the slope of the current $I_S$ of the secondary winding W2 at the OFF time $T_{OFF}$ is gentle. Conventionally, since the OFF time is short, the DC/DC converter 200r operated in the continuous current mode as illustrated in FIG. 2. In FIG. 4B, by setting the period $T_{P2}$ longer than the period $T_{P1}$ of the non-low voltage state, the OFF time $T_{OFF2}$ in the low voltage state becomes sufficiently longer than the OFF time of the non-low voltage state. Therefore, during the OFF time $T_{OFF}$, the current $I_S$ of the secondary winding W2 can be lowered to a sufficiently small amount (zero in FIG. 4B).

In this manner, in the DC/DC converter 200 according to the embodiment, it is possible to reduce the current flowing through the transformer in the low voltage state. Accordingly, since the transformer T1, the switching transistor M1, or the rectifier diode D1 having a low withstand voltage can be employed, the cost can be lowered. In particular, since the switching transistor M1 has a low withstand voltage, the switching transistor M1 can be housed in the same package as that of the primary side controller 300.

The present disclosure is recognized by the block diagram or the circuit diagram of FIG. 3 or intended to cover various devices and circuits derived from the above description, but is not limited to the specific configuration. Hereinafter, a more specific configuration example or an example will be described in order to help understand and clarify the essence of the present disclosure and a circuit operation thereof, rather than to narrow the scope of the present disclosure.

Figure 5:
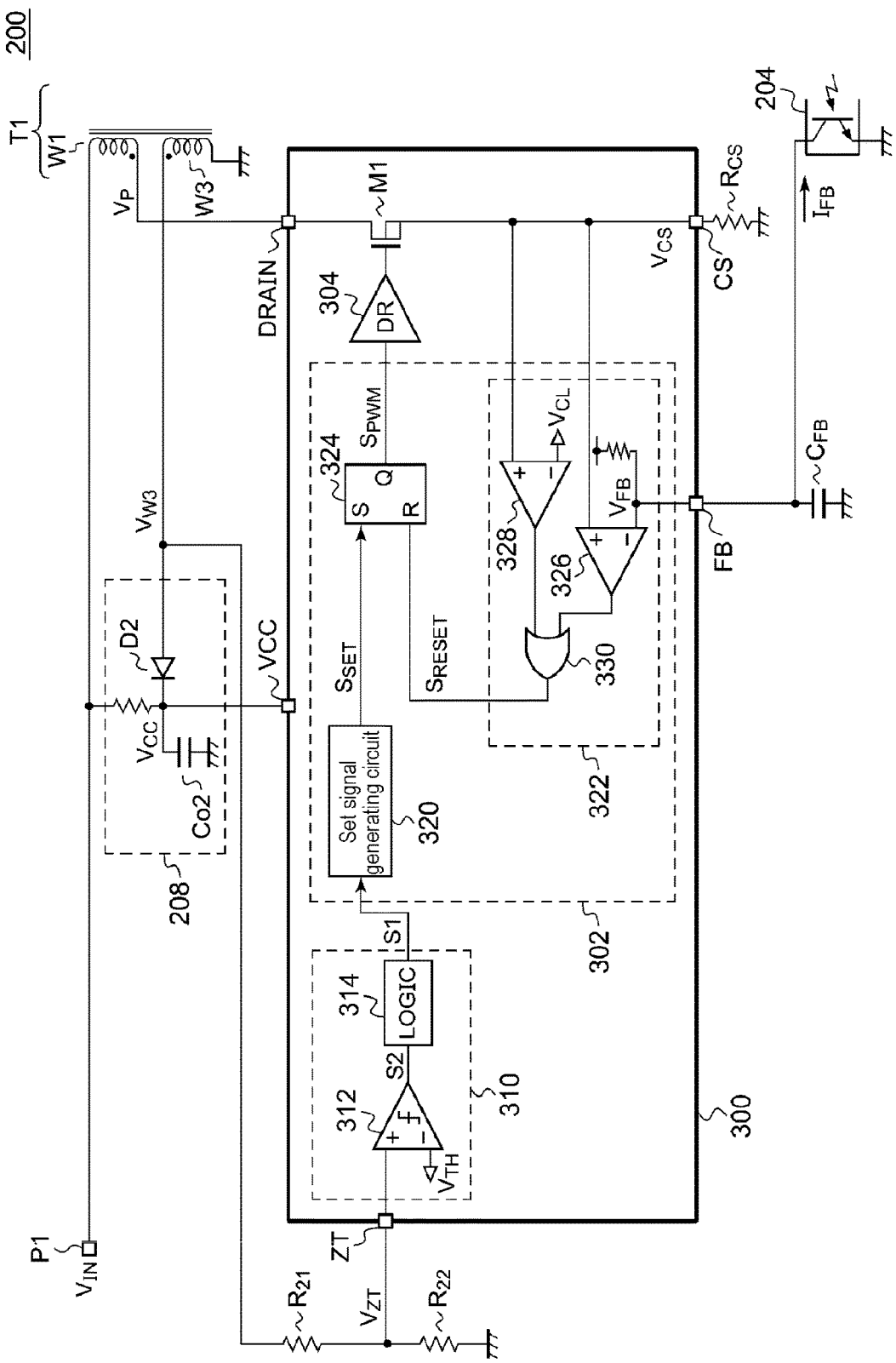
FIG. 5 is a circuit diagram illustrating a configuration example of a primary side controller.

FIG. 5 is a circuit diagram illustrating a configuration example of the primary side controller 300. The low voltage state detecting circuit 310 includes a comparator 312. The comparator 312 compares a voltage $V_{ZT}$ of the ZT terminal with a threshold voltage $V_{TH}$ corresponding to a predetermined value $V_L$, and generates a comparison signal S2 which has a high level when $V_{ZT}$ is greater than $V_{TH}$ ($V_{ZT}>V_{TH}$), i.e., in the non-low voltage state ($V_{OUT}>V_L$), and which has a low level when $V_{ZT}$ is smaller than $V_{TH}$ ($V_{ZT}<V_{TH}$), i.e., in the low voltage state ($V_{OUT}<V_L$). The low voltage state detecting circuit 310 outputs a determination signal S1 corresponding to the comparison signal S2. Since $V_{ZT}$ is proportional to $V_{OUT}$ during an OFF time of the switching transistor M1, the logic circuit 314 may latch the comparison signal S2 during the OFF time at every cycle as the determination signal S2.

The pulse width modulator 302 includes a set signal generating circuit 320, a reset signal generating circuit 322, and a logic circuit 324. The set signal generating circuit 320 generates a set signal $S_{SET}$ asserted (e.g., having a high level) at every period of the pulse signal $S_{PWM}$. The period of the set signal $S_{SET}$ may be changed depending on the determination signal S1 and is $T_{P1}$ in the non-low voltage state and $T_{P2}$ in the low voltage state. The set signal $S_{SET}$ is a signal defining a timing at which the pulse signal $S_{PWM}$ transitions to an ON level, i.e., at a timing at which the switching transistor M1 is turned on. Therefore, increasing the period of the set signal $S_{SET}$ is equivalent to delaying a timing at which the switching transistor M1 is turned on, i.e., lengthening the OFF time $T_{OFF}$.

The reset signal generating circuit 322 generates a reset signal $S_{RESET}$ asserted (having a high level) depending on the feedback signal $V_{FB}$. The reset signal generating circuit 322 includes a PWM comparator 326. The PWM comparator 326 compares the current detection signal $V_{CS}$ with the feedback signal $V_{FB}$, and when $V_{CS}$ is greater than $V_{FB}$ ($V_{CS}>V_{FB}$), the PWM comparator 326 asserts a comparison signal S3 (e.g., a high level). A current limit comparator 328 is installed for pulse-by-pulse overcurrent protection. The current limit comparator 328 compares the current detection signal $V_{CS}$ with a threshold $V_{CL}$ defining an allowable peak value of the current $I_S$, and when $V_{CS}$ is greater than $V_{CL}$ ($V_{CS}>V_{CL}$), the current limit comparator 328 asserts a comparison signal S4 (e.g., a high level). When at least one of the comparison signals S3 and S4 is asserted, an OR gate 330 asserts the reset signal $S_{RESET}$.

The logic circuit 324 generates the pulse signal $S_{PWM}$ which shifts to an ON level (high level) in response to the set signal $S_{SET}$ and shifts to an OFF level (low level) in response to the reset signal $S_{RESET}$. The logic circuit 324 may be configured as an SR flipflop or a D flipflop.

FIG. 6 is a diagram illustrating a configuration example of a set signal generating circuit 320a. The set signal generating circuit 320a of FIG. 6 includes an oscillator 332 and a counter 334. The oscillator 332 oscillates at a predetermined frequency. In the non-low voltage state, the counter 334 sets an M period (where M is a natural number) of an oscillation signal from the oscillator 332 as the period $T_{P1}$ of the set signal $S_{SET}$, wherein M may be 1.

$T_{P1}=T_{OSC}\times M$

In the low voltage state, the counter 334 sets an N period (where N>M) of an oscillation signal S5 as the period $T_{P2}$ of the set signal $S_{SET}$.

$T_{P2}=T_{OSC}\times N$

In modifications, the set signal generating circuit may include an oscillator whose oscillation frequency (period) may be a variable frequency switchable depending on the determination signal S1. The oscillator is a voltage controlled oscillator (VCO), and a control voltage may be switched depending on the determination signal S1. Alternatively, the oscillator 332 may include a PLL circuit and a frequency division ratio may be switched depending on the determination signal S1.

The present disclosure has been described above based on the embodiment. It is to be understood by those skilled in the art that the embodiment is merely illustrative and may be differently modified by any combination of the components or processes, and the modifications are also within the scope of the present disclosure. Hereinafter, these modifications will be described.

First Modification

Figure 7A:
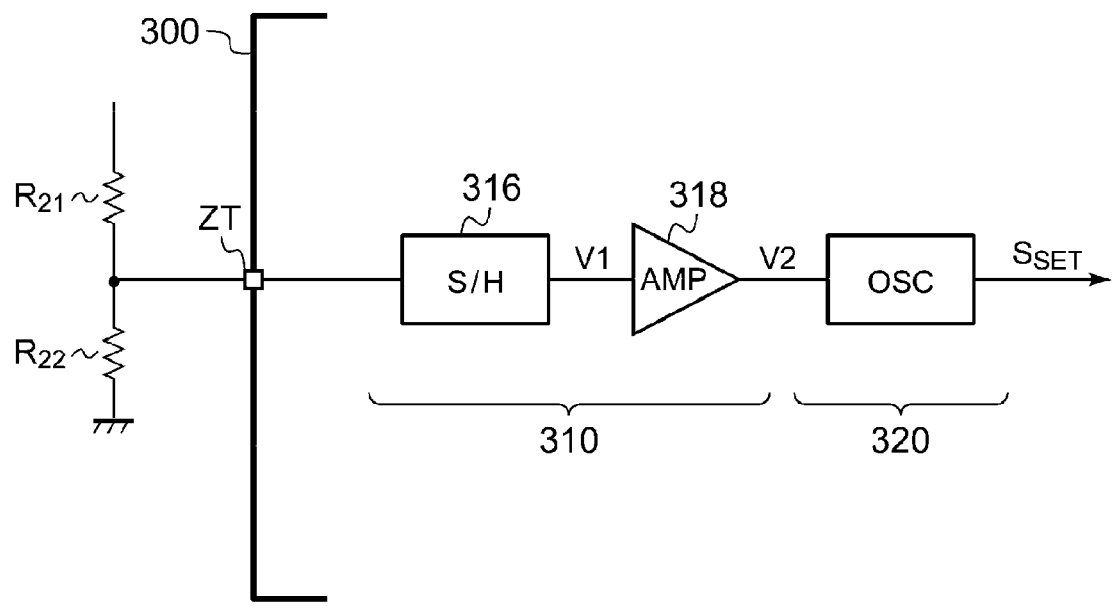
FIG. 7A is a block diagram of a low voltage state detecting circuit and a set signal generating circuit according to a first modification.
Figure 7B:
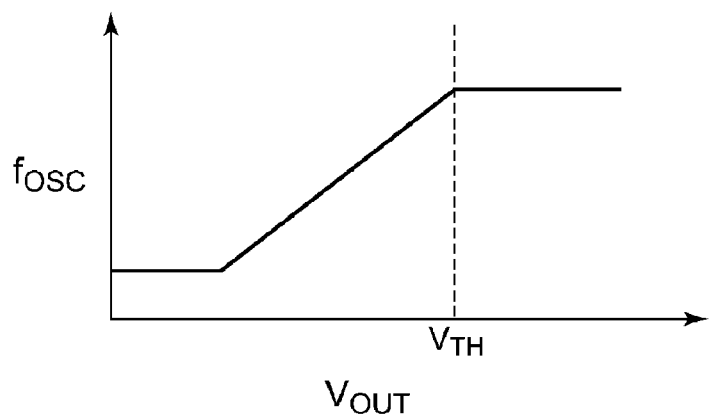
FIG. 7B is a diagram illustrating a relationship between an output voltage $V_{OUT}$ and a frequency $f_{OSC}$ of a set signal $S_{SET}$.

In the embodiment, the period $T_{P2}$ of the pulse signal $S_{PWM}$ in the low voltage state is constant, but it may be changed depending on the output voltage $V_{OUT}$. FIG. 7A is a block diagram of a low voltage state detecting circuit 310 and a set signal generating circuit 320 according to a first modification. The low voltage state detecting circuit 310 includes a sample hold circuit 316 and an amplifier 318. The sample hold circuit 316 samples and holds a voltage $V_{ZT}$ of the ZT terminal at an OFF time of the switching transistor M1. The amplifier 318 amplifies an output voltage V1 from the sample hold circuit 316 as necessary. The set signal generating circuit 320 oscillates at a frequency $f_{OSC}$ corresponding to an output voltage V2 from the amplifier 318. FIG. 7B is a diagram illustrating a relationship between the output voltage $V_{OUT}$ and a frequency $f_{OSC}$ of the set signal $S_{SET}$.

Second Modification

Figure 8:
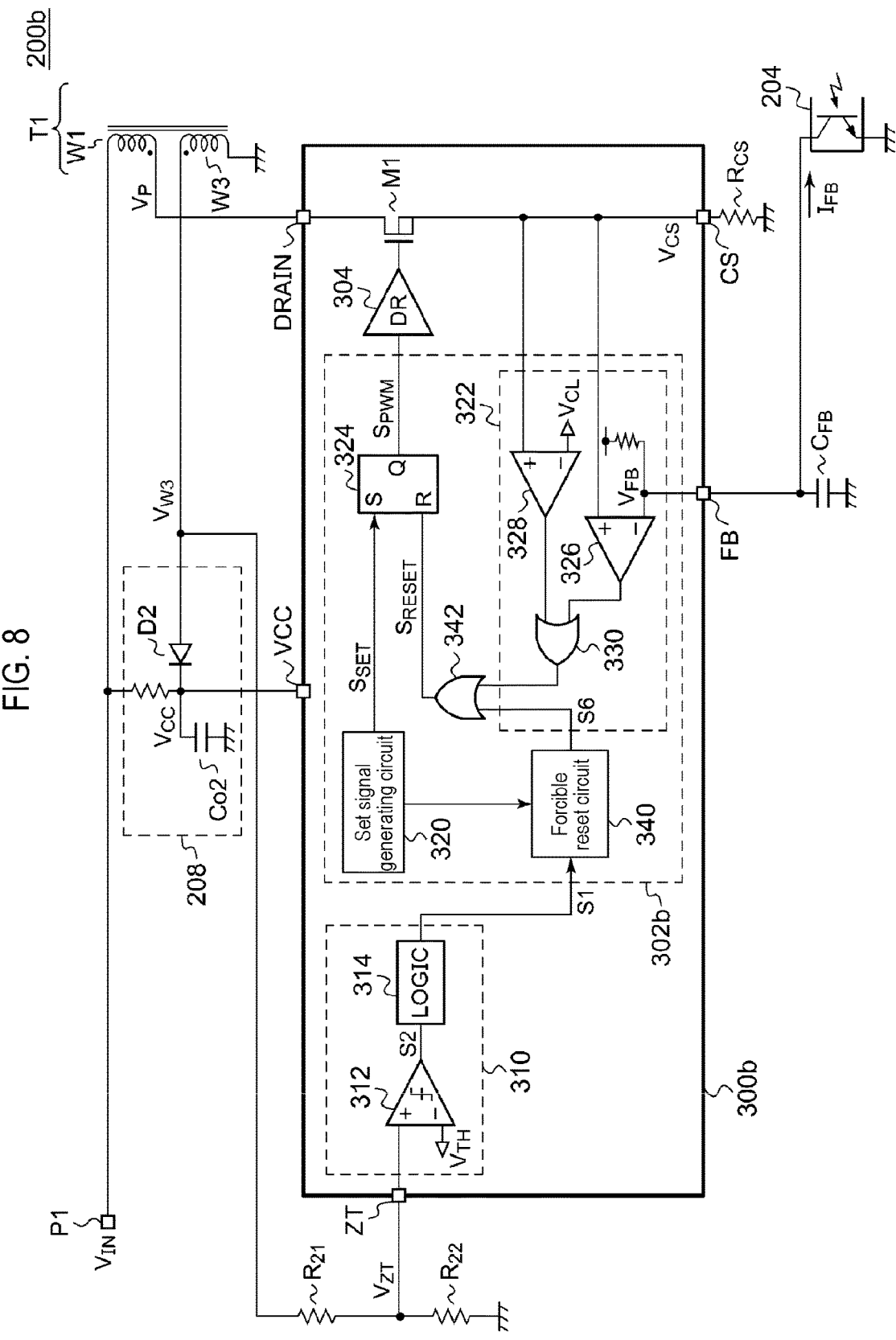
FIG. 8 is a circuit diagram of a primary side controller according to a second modification.

In the embodiment, the discontinuous current mode in the low voltage state is realized by lengthening an OFF time by changing the period of the pulse signal $S_{PWM}$. On the other hand, in a second modification, the discontinuous current mode is realized by shortening an ON time in the low voltage state, while keeping the period of the pulse signal $S_{PWM}$ constant. FIG. 8 is a circuit diagram of a primary side controller 300b according to the second modification. A pulse width modulator 302b generates a pulse signal $S_{PWM}$ whose ON time $T_{ON}$ is adjusted depending on a feedback signal from the secondary side in the non-low voltage state. Further, the pulse width modulator 302b generates a narrow pulse signal whose ON time is independent of the feedback signal $V_{FB}$, in the low voltage state. A forcible reset circuit 340 asserts a forcible reset signal S6 after the lapse of a predetermined period of time from assertion of the set signal $S_{SET}$ in the low voltage state. The forcible reset signal S6 is input to a logic circuit 324 through an OR gate 342.

According to this modification, by setting a timing at which the switching transistor M1 is turned off earlier than the reset signal generated by the PWM comparator 326, it is possible to generate a pulse signal whose ON time is short and narrow. By switching the switching transistor M1 with the narrow pulse signal, since the increment of the current $I_S$ of the primary winding W1 at the ON time of the switching transistor M1 can be reduced, it is possible to reduce a current flowing through the transformer in the low voltage state.

Third Modification

In the embodiment, the low voltage state detecting circuit 310 monitors a voltage of the auxiliary winding W3, but the present disclosure is not limited thereto. Since the FB signal indicates a difference between the output voltage $V_{OUT}$ and the target voltage, it may be said to indirectly indicate the output voltage $V_{OUT}$. Therefore, the low voltage state detecting circuit 310 may monitor a low voltage state using the FB signal. Alternatively, a comparator for comparing the output voltage $V_{OUT}$ with the threshold $V_L$ may be disposed on the secondary side of the transformer T1 and an output of the comparator may be transmitted from a photocoupler different from the photocoupler 204 to the primary side controller 300.

Fourth Modification

In the embodiment, the diode rectifier type DC/DC converter has been described, but the present disclosure is also applicable to a synchronous rectification type DC/DC converter. Further, the switching transistor M1 may be installed outside the primary side controller 300.

Applications

Finally, applications of the DC/DC converter 200 will be described. The DC/DC converter 200 can be used for the AC/DC converter 100 suitably used for a power source block of an AC adapter or an electronic device.

FIG. 9 is a diagram illustrating an AC adapter 800 including the AC/DC converter 100. The AC adapter 800 includes a plug 802, a housing 804, and a connector 806. The plug 802 receives a commercial AC voltage $V_{AC}$ from an outlet (not shown). The AC/DC converter 100 is mounted in the housing 804. A DC output voltage $V_{OUT}$ generated by the AC/DC converter 100 is supplied from the connector 806 to the electronic device 810. Examples of the electronic device 810 include a notebook PC, a digital camera, a digital video camera, a mobile phone, a portable audio player, and the like.

Figure 10A:
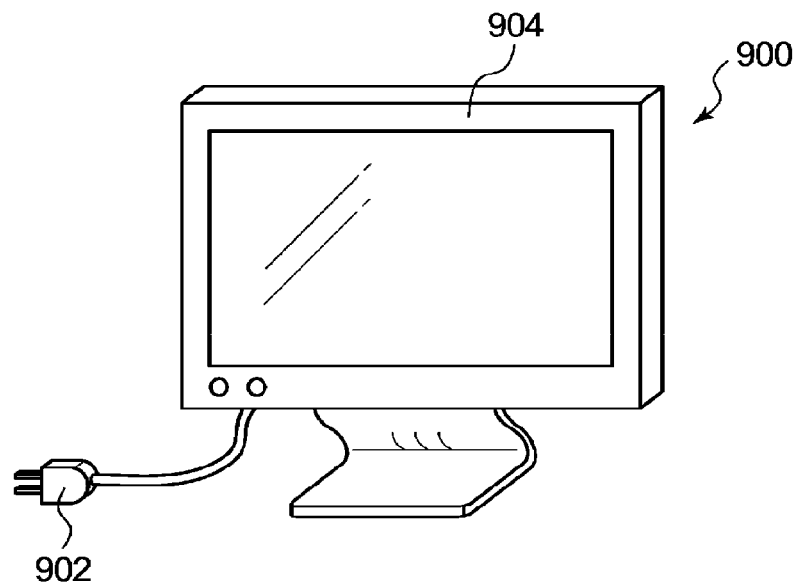
FIGS. 10A and 10B are diagrams illustrating an electronic device including an AC/DC converter.
Figure 10B:
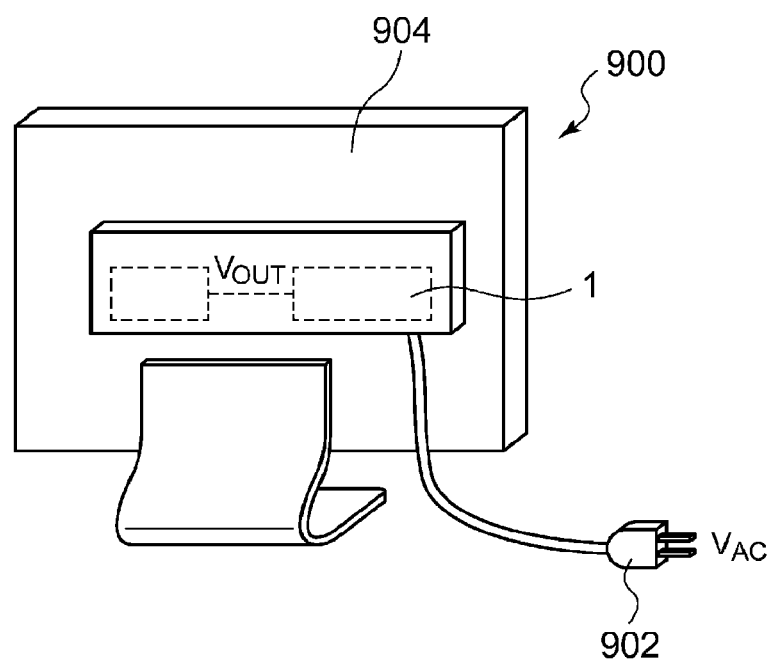

FIGS. 10A and 10B are diagrams illustrating an electronic device 900 including the AC/DC converter 100. The electronic device 900 of FIGS. 10A and 10B is a display device, but the type of the electronic device 900 is not particularly limited thereto, and it may be a device, which incorporates a power source device, such as an audio device, a refrigerator, a washing machine, a vacuum cleaner, or the like.

The plug 902 receives a commercial AC voltage $V_{AC}$ from an outlet (not shown). The AC/DC converter 100 is mounted in a housing 904. A DC output voltage $V_{OUT}$ generated by the AC/DC converter 100 is supplied to a load, which is mounted in the same housing 904, such as a microcomputer, a digital signal processor (DSP), a power source circuit, a lighting device, an analog circuit, a digital circuit, or the like.

According to the present disclosure in some embodiments, it is possible to reduce a current flowing through a transformer in a low voltage state.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A primary side controller for controlling a switching transistor on a primary side of an isolated DC/DC converter, comprising:
    a low voltage state detecting circuit configured to detect a low voltage state in which an output voltage of the DC/DC converter is lower than a predetermined value; and
    a pulse width modulator configured to generate a pulse signal having an ON time which is adjusted depending on a feedback signal from a secondary side of the isolated DC/DC converter,
    wherein a period of the pulse signal in the low voltage state is longer than a period of the pulse signal in a non-low voltage state in which the output voltage is higher than the predetermined value,
    wherein the pulse width modulator comprises:
        a reset signal generating circuit configured to generate a reset signal asserted depending on the feedback signal;
        a set signal generating circuit configured to generate a periodic set signal; and
        a logic circuit configured to generate the pulse signal which transitions to an ON level in response to the set signal and to an OFF level in response to the reset signal,
    wherein a period of the set signal in the low voltage state is longer than a period of the set signal in the non-low voltage state, and
    wherein the set signal generating circuit includes:
        an oscillator configured to oscillate at a predetermined frequency; and
        a counter configured to set an M period of an oscillation signal from the oscillator in the non-low voltage state as the period of the set signal, and to set an N period of the oscillation signal in the low voltage state as the period of the set signal, where M and N are natural numbers and N is greater than M.

2. A primary side controller for controlling a switching transistor on a primary side of an isolated DC/DC converter, comprising:
    a low voltage state detecting circuit configured to detect a low voltage state in which an output voltage of the DC/DC converter is lower than a predetermined value; and
    a pulse width modulator configured to generate a pulse signal having an ON time which is adjusted depending on a feedback signal from a secondary side of the isolated DC/DC converter,
    wherein a period of the pulse signal in the low voltage state is longer than a period of the pulse signal in a non-low voltage state in which the output voltage is higher than the predetermined value,
    wherein the pulse width modulator comprises:
        a reset signal generating circuit configured to generate a reset signal asserted depending on the feedback signal;
        a set signal generating circuit configured to generate a periodic set signal; and a logic circuit configured to generate the pulse signal which transitions to an ON level in response to the set signal and to an OFF level in response to the reset signal, wherein a period of the set signal in the low voltage state is longer than a period of the set signal in the non-low voltage state, wherein the set signal generating circuit includes a variable frequency oscillator, and wherein an oscillation frequency of the oscillator is dependent on a detection signal corresponding to the output voltage in the low voltage state.

3. A primary side controller for controlling a switching transistor on a primary side of an isolated DC/DC converter, comprising:

a low voltage state detecting circuit configured to detect a low voltage state in which an output voltage of the DC/DC converter is lower than a predetermined value; and a pulse width modulator configured to generate a pulse signal having an ON time which is adjusted depending on a feedback signal from a secondary side of the isolated DC/DC converter, wherein a period of the pulse signal in the low voltage state is longer than a period of the pulse signal in a non-low voltage state in which the output voltage is higher than the predetermined value, wherein the pulse width modulator comprises:
a reset signal generating circuit configured to generate a reset signal asserted depending on the feedback signal;
a set signal generating circuit configured to generate a periodic set signal; and
a logic circuit configured to generate the pulse signal which transitions to an ON level in response to the set signal and to an OFF level in response to the reset signal, wherein a period of the set signal in the low voltage state is longer than a period of the set signal in the non-low voltage state, wherein the reset signal generating circuit includes a reset comparator configured to compare a current detection signal indicating a current flowing through the switching transistor with the feedback signal, and wherein the reset signal is dependent on an output signal of the reset comparator.

4. The controller of claim 1, wherein the DC/DC converter comprises a transformer including a primary winding, a secondary winding, and an auxiliary winding, and wherein the low voltage state detecting circuit is configured to monitor the output voltage based on a voltage across the auxiliary winding at an OFF time of the switching transistor.

5. The controller of claim 1, wherein the switching transistor is housed in the same package as that of the primary side controller.

6. The controller of claim 1, wherein the reset signal generating circuit includes a reset comparator configured to compare a current detection signal indicating a current flowing through the switching transistor with the feedback signal, and wherein the reset signal is dependent on an output signal of the reset comparator.

7. An isolated DC/DC converter comprising the primary side controller of claim 1.

8. An isolated DC/DC converter, comprising:
a transformer including a primary winding, a secondary winding, and an auxiliary winding;
a switching transistor connected to the primary winding;
a secondary side rectifier circuit configured to rectify a current flowing through the secondary winding to generate an output voltage;
a photocoupler including a light emitting element and a light receiving element;
a feedback circuit configured to drive the light emitting element of the photocoupler with a current corresponding to a difference between the output voltage and a target value; and
a primary side controller configured to drive the switching transistor based on a feedback signal corresponding to a current flowing through the light receiving element of the photocoupler, wherein the primary side controller is configured to drive (i) the switching transistor depending on a first pulse signal which has a first period and an ON time of the first pulse signal is adjusted depending on the feedback signal when a voltage across the auxiliary winding is greater than a predetermined value, and drive (ii) the switching transistor depending on a second pulse signal which has a second period longer than the first period and an ON time of the second pulse signal is adjusted depending on the feedback signal when the voltage across the auxiliary winding is smaller than the predetermined value.

9. An electronic device, comprising:
a load;
a diode rectifier circuit configured to full-wave rectify a commercial AC voltage;
a smoothing capacitor configured to smooth an output voltage of the diode rectifier circuit to generate a DC input voltage; and
the DC/DC converter of claim 8, configured to step down the DC input voltage and supplies the same to the load.

10. A power adaptor, comprising:
a diode rectifier circuit configured to full-wave rectify a commercial AC voltage;
a smoothing capacitor configured to smooth an output voltage of the diode rectifier circuit to generate a DC input voltage; and
The DC/DC converter of claim 8, configured to step down the DC input voltage and supplies the same to a load.

11. A primary side controller for controlling a switching transistor on a primary side of an isolated DC/DC converter, comprising:
a first terminal connected to one end of an auxiliary winding of the isolated DC/DC converter;
a low voltage state detecting circuit configured to detect a low voltage state in which an output voltage of the isolated DC/DC converter is lower than a predetermined value based on a voltage of the first terminal at an OFF time of the switching transistor; and
a pulse width modulator configured to generate a pulse signal having an ON time which is adjusted depending on a feedback signal from a secondary side of the isolated DC/DC converter, wherein the pulse width modulator includes:
a reset signal generating circuit configured to generate a reset signal asserted depending on the feedback signal;
a set signal generating circuit configured to generate a periodic set signal; and a logic circuit configured to generate the pulse signal which transitions to an ON level in response to the set signal and to an OFF level in response to the reset signal, wherein a period of the set signal in the low voltage state is longer than a period of the set signal in a non-low voltage state in which the output voltage is higher than the predetermined value, and wherein the set signal generating circuit includes:
  an oscillator configured to oscillate at a predetermined frequency; and
  a counter configured to set an M period of an oscillation signal from the oscillator in the non-low voltage state as the period of the set signal, and to set an N period of the oscillation signal in the low voltage state as the period of the set signal, where M and N are natural numbers and N is greater than M.

12. The controller of claim 11, further comprising a second terminal electrically connected to one end of a primary winding of the isolated DC/DC converter.

13. The controller of claim 12, further comprising a third terminal electrically connected to the other end of the primary winding of the isolated DC/DC converter.

14. A primary side controller for controlling a switching transistor on a primary side of an isolated DC/DC converter, comprising:
  a first terminal connected to one end of an auxiliary winding of the isolated DC/DC converter;
  a low voltage state detecting circuit configured to detect a low voltage state in which an output voltage of the isolated DC/DC converter is lower than a predetermined value based on a voltage of the first terminal at an OFF time of the switching transistor; and
  a pulse width modulator configured to generate a pulse signal having an ON time which is adjusted depending on a feedback signal from a secondary side of the isolated DC/DC converter,
  wherein the pulse width modulator comprises:
    a reset signal generating circuit configured to generate a reset signal asserted depending on the feedback signal;
    a set signal generating circuit configured to generate a periodic set signal; and
    a logic circuit configured to generate the pulse signal which transitions to an ON level in response to the set signal and to an OFF level in response to the reset signal,
  wherein a period of the set signal in the low voltage state is longer than a period of the set signal in a non-low voltage state in which the output voltage is higher than the predetermined value, wherein the set signal generating circuit includes a variable frequency oscillator, and wherein an oscillation frequency of the oscillator is dependent on a detection signal corresponding to the output voltage in the low voltage state.

15. The controller of claim 14, further comprising a second terminal electrically connected to one end of a primary winding of the isolated DC/DC converter.

16. The controller of claim 15, further comprising a third terminal electrically connected to the other end of the primary winding of the isolated DC/DC converter.

17. A primary side controller for controlling a switching transistor on a primary side of an isolated DC/DC converter, comprising:
  a first terminal connected to one end of an auxiliary winding of the isolated DC/DC converter;
  a low voltage state detecting circuit configured to detect a low voltage state in which an output voltage of the isolated DC/DC converter is lower than a predetermined value based on a voltage of the first terminal at an OFF time of the switching transistor; and
  a pulse width modulator configured to generate a pulse signal having an ON time which is adjusted depending on a feedback signal from a secondary side of the isolated DC/DC converter,
  wherein the pulse width modulator comprises:
    a reset signal generating circuit configured to generate a reset signal asserted depending on the feedback signal;
    a set signal generating circuit configured to generate a periodic set signal; and
    a logic circuit configured to generate the pulse signal which transitions to an ON level in response to the set signal and to an OFF level in response to the reset signal,
  wherein a period of the set signal in the low voltage state is longer than a period of the set signal a the non-low voltage state in which the output voltage is higher than the predetermined value,
  wherein the reset signal generating circuit includes a reset comparator configured to compare a current detection signal indicating a current flowing through the switching transistor with the feedback signal, and
  wherein the reset signal is dependent on an output signal of the reset comparator.

18. The controller of claim 17, further comprising a second terminal electrically connected to one end of a primary winding of the isolated DC/DC converter.

19. The controller of claim 18, further comprising a third terminal electrically connected to the other end of the primary winding of the isolated DC/DC converter.

* * * * *